United States Patent
Hirano et al.

(10) Patent No.: US 6,522,821 B1
(45) Date of Patent: Feb. 18, 2003

(54) DISPERSION-COMPENSATING OPTICAL FIBER AND OPTICAL TRANSMISSION SYSTEM INCLUDING THE SAME

(75) Inventors: Masaaki Hirano, Kanagawa (JP); Motonori Nakamura, Kanagawa (JP); Takatoshi Kato, Kanagawa (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/584,087

(22) Filed: May 31, 2000

(30) Foreign Application Priority Data

Jun. 8, 1999 (JP) .......................... 11-160918

(51) Int. Cl.$^7$ .............. G02B 6/02; G02B 6/22
(52) U.S. Cl. .............. 385/127; 385/123; 385/126; 385/128; 359/161
(58) Field of Search .................. 385/127, 123, 385/126, 128

(56) References Cited

U.S. PATENT DOCUMENTS 6,072,929 A * 6/2000 Kato et al. ............... 385/123
6,178,279 B1 * 1/2001 Mukasa et al. ........... 385/123
6,275,638 B1 * 8/2001 Sasaoka et al. .......... 385/127

FOREIGN PATENT DOCUMENTS

JP        62-165608     7/1987  ................ 6/22

OTHER PUBLICATIONS

Warren J. Smith, Modern Optical Engineering 3$^{rd}$. ed., McGraw–Hill, p. 287.*

"Broadband Dispersion Compensating Module Considering Its Attenuation Spectrum Behavior for WDM System", by Kashiwada et al., WM12–1/229–231.

"Design and Manufacture of Dispersion Compensating Fibre for Simuitaneous Compensation of Dispersion and Dispersion Slope", by Grünter–Nielson et al., WM13–1/232–234.

* cited by examiner

Primary Examiner—Cassandra Spyrou
Assistant Examiner—Leo Boutsikaris
(74) Attorney, Agent, or Firm—McDermott, Will & Emery

(57) ABSTRACT

The present invention relates to a dispersion-compensating optical fiber which can transmit, with a low loss, light signals having a high power; and an optical transmission system including the same. This dispersion-compensating optical fiber is insured its single mode at a wavelength of 1.55 $\mu$m, and comprises, about the optical axis, at least a first core having a refractive index $n_1$, a second core having a refractive index $n_2$ ($>n_1$), and a cladding having a refractive index $n_3$ ($<n_2$). Also, this dispersion-compensating optical fiber has a chromatic dispersion of −10 ps/nm/km or less at the wavelength of 1.55 $\mu$m, whereas the ratio $2a/2b$ of the outside diameter $2a$ of the first core with respect to the outside diameter $2b$ of the second core is 0.05 or more.

11 Claims, 7 Drawing Sheets

DISPERSION-COMPENSATING OPTICAL FIBER AND OPTICAL TRANSMISSION SYSTEM INCLUDING THE SAME

BACKGROUND OF THE INVENTION

1. Field of the Invention

The present invention relates to a dispersion-compensating optical fiber for compensating for positive chromatic dispersions of typical single-mode optical fibers in a 1.5-μm wavelength band, and an optical transmission system in which this dispersion-compensating optical fiber is employed as an optical transmission line.

2. Related Background Art

Since optical fibers mainly composed of silica glass yield the lowest transmission loss with respect to light in a 1.55-μm wavelength band, optical transmission systems employing optical fibers as their optical transmission lines utilize light signals in the 1.55-μm wavelength band. Typical single-mode optical fibers having their zero-dispersion wavelength in a 1.3-μm wavelength band, on the other hand, have positive chromatic dispersions in the 1.5-μm wavelength band. As the chromatic dispersion is greater, the waveform of each light signal is more likely to deteriorate, and the wave form of each light signal further deteriorates upon interactions between the chromatic dispersion and nonlinear optical effects. Therefore, in order to compensate for the positive chromatic dispersions of typical single-mode optical fibers in the 1.5-μm wavelength band, i.e., in order to reduce the chromatic dispersion of the whole optical transmission line, dispersion-compensating optical fibers having a negative chromatic dispersion in the 1.5-μm wavelength band and the above-mentioned typical single-mode optical fibers are combined together.

For example, document 1—T. Kashiwada, et al., "Broadband dispersion compensating module considering its attenuation spectrum behavior for WDM system," OFC'99 Technical Digest, WM12 (1999)—and document 2—L. Grunder-Nielsen, et al., "Design and manufacture of dispersion compensating fibre for simultaneous compensation of dispersion and dispersion slope," OFC'99 Technical Digest, WM13 (1999)—disclose dispersion-compensating optical fibers such as one having the refractive index profile 450 shown in FIG. 1. The conventional dispersion-compensating optical fiber shown in the drawing comprises a core extending along an optical axis and having a refractive index $n_1$; a depressed region provided so as to surround this core and having a refractive index $n_2$ ($<n_1$); and a cladding provided so as to surround the depressed region and having a refractive index $n_3$ ($>n_2$, $<n_1$). In the refractive index profile 450 shown in FIG. 1, areas 451, 452, and 453 indicate refractive indices of the core, depressed region, and cladding, respectively.

SUMMARY OF THE INVENTION

The inventors have studied the above-mentioned conventional dispersion-compensating optical fibers and, as a result, have found problems as follows. Namely, the conventional dispersion-compensating optical fibers having a refractive index profile such as the one shown in FIG. 1 have a small effective area while confining a large amount of light into the core, whereby nonlinear optical effects such as self phase modulation are likely to occur therein. Therefore, optical transmission systems employing these dispersion-compensating optical fibers as their optical transmission lines cannot transmit light signals having a high power, and thus must shorten the spacing between repeater stations including optical amplifiers for optically amplifying light signals, which inevitably increases the number of repeater stations needed.

Also, since the conventional dispersion-compensating optical fibers having a refractive index profile such as the one shown in FIG. 1 have a shorter cutoff wavelength for fundamental-mode, cutoffs caused by disturbances such as microbend and macrobend have been affecting light on the shorter wavelength side, thereby increasing the transmission loss in the signal wavelength band. Therefore, also from this point, the distance between repeaters including optical amplifiers and the like has become shorter in the optical transmission systems employing the conventional dispersion-compensating optical fibers as their optical transmission lines, thus necessitating a number of repeaters to be provided (lowering performance per cost).

In order to overcome problems such as those mentioned above, it is an object of the present invention to provide a dispersion-compensating optical fiber capable of transmitting, with a low loss, light signals having a high power; and an optical transmission system employing the same.

The dispersion-compensating optical fiber according to the present invention is insured its single mode at a wavelength of 1.55 μm and comprises, at least, a core region having a first core extending along a predetermined axis and a second core provided on the outer periphery of the first core, and a cladding provided on the outer periphery of the core region. The first core has a refractive index $n_1$ and an outside diameter $2a$. The second core has a refractive index $n_2$ higher than that of the first core and an outside diameter $2b$. The cladding has a refractive index $n_3$ lower than that of the second core.

In particular, the dispersion-compensating optical fiber according to the present invention has a chromatic dispersion of −10 ps/nm/km or less at the wavelength of 1.55 μm, whereas the ratio $2a/2b$ of the outside diameter $2a$ of the first core with respect to the outside diameter $2b$ of the second core is 0.05 or more. Due to the foregoing configuration, this dispersion-compensating optical fiber not only compensates for chromatic dispersions of typical single-mode optical fibers, but also can suppress the generation of nonlinear optical effects more effectively by yielding a larger effective area.

The dispersion-compensating optical fiber according to the present invention may comprise a depressed region provided between the second core and the cladding. Here, the depressed region has a refractive index $n_4$ lower than that of each of the second core and the cladding. Due to this configuration, the dispersion-compensating optical fiber has a longer cutoff wavelength for fundamental-mode, and yields a negative dispersion slope at the wavelength of 1.55 μm. Since the dispersion slope at the wavelength of 1.55 μm is negative as such, the dispersion-compensating optical fiber can compensate for both chromatic dispersion and dispersion slope of typical single-mode optical fibers. The dispersion-compensating optical fiber may further comprise an intermediate region having a refractive index $n_5$ ($>n_3$, $<n_2$) provided between the depressed region and the cladding region.

In the dispersion-compensating optical fiber according to the present invention, the ratio $2a/2b$ of the outside diameter $2a$ of the first core with respect to the outside diameter $2b$ of the second core is 0.6 or less. Setting the outside diameter ratio between the first and second cores as such can effectively suppress the increase of loss caused by bending. Specifically, the increase of loses in the dispersion-compensating optical fiber with respect to light having a wavelength of 1.55 µm when wound by one turn about a mandrel having a diameter of 32 mm is 0.5 dB or less. As a consequence, even if disturbances such as microbend and macrobend occur upon cabling, the increase of transmission loss in the signal wavelength band can be suppressed effectively.

On the other hand, the optical transmission system according to the present invention comprises, as a WDM (Wavelength Division Multiplexing).optical transmission line, a dispersion-compensating optical fiber having a structure such as one mentioned above; and another optical fiber, optically connected to the dispersion-compensating optical fiber, having a positive chromatic dispersion at the wavelength of 1.55 µm. Due to such a configuration, both chromatic dispersion and dispersion slope of the whole optical transmission system are reduced in a wavelength band in use, and the signal distortion of each signal wavelength caused by chromatic dispersion and nonlinear optical effects is effectively suppressed. Here, the dispersion slope is given by the differential coefficient of the chromatic dispersion.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of the dispersion-compensating optical fiber according to the present invention will be explained with reference to FIGS. 2A to 3B and 4 to 7. In the explanation of the drawings, constituents identical to each other will be referred to with numerals or letters identical to each other without repeating their overlapping descriptions.

First Embodiment

Figure 2A:
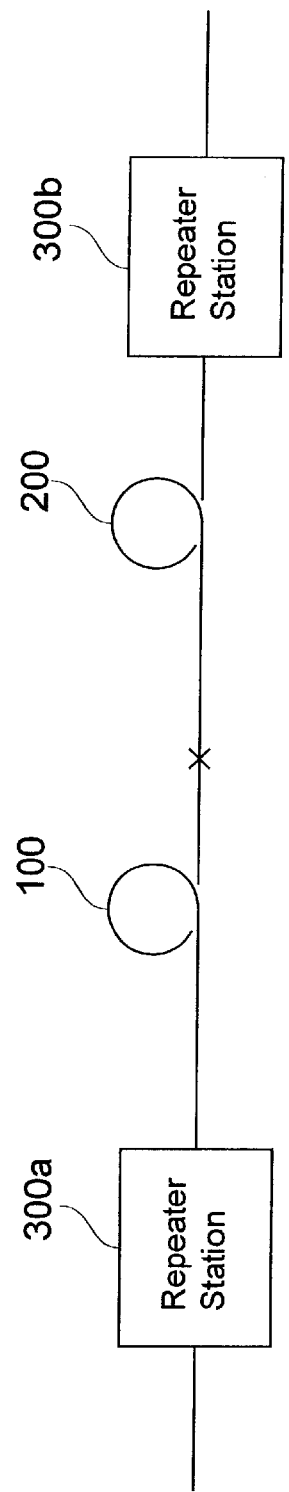
FIGS. 2A and 2B are views each showing a configuration of an optical transmission line system employing a dispersion-compensating optical fiber according to the present invention.
Figure 2B:
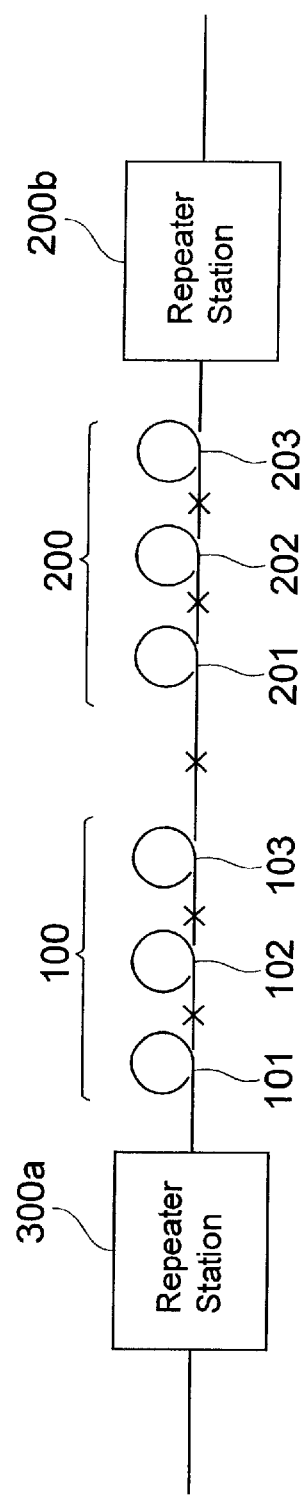
Figure 3A:
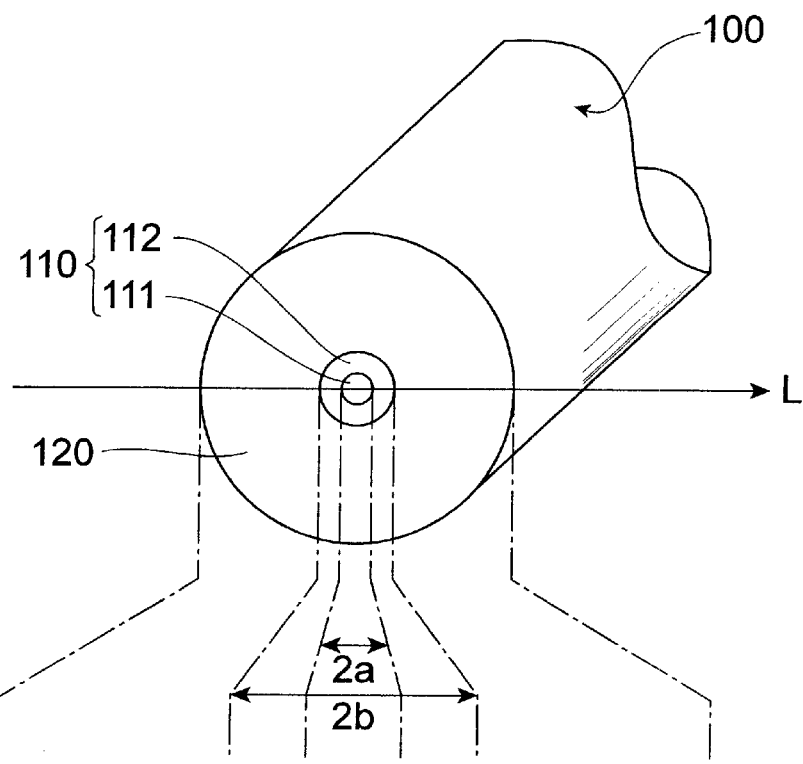
FIGS. 3A and 3B are views showing a cross-sectional structure of a first embodiment of the dispersion-compensating optical fiber according to the present invention and its refractive index profile, respectively.
Figure 3B:
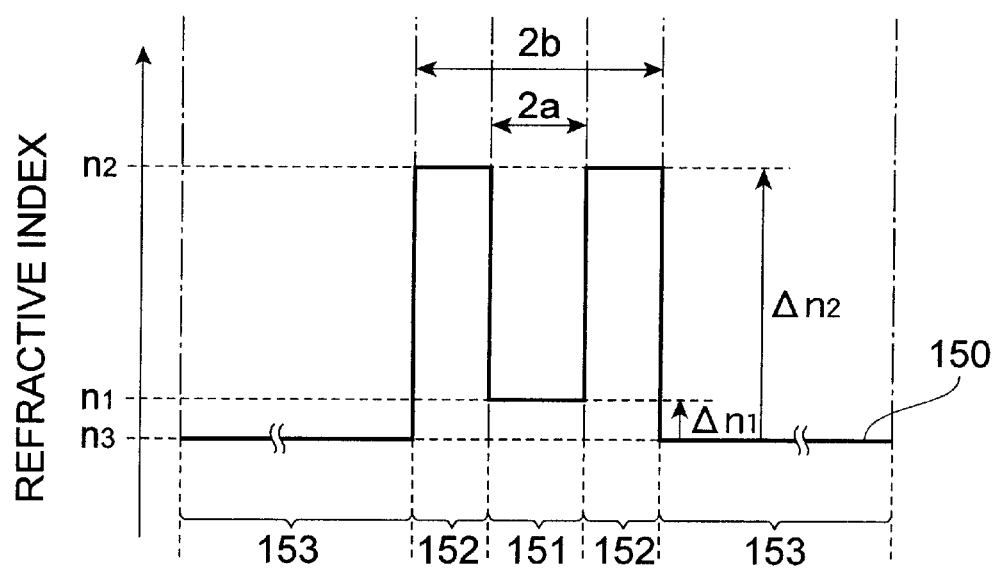

FIGS. 2A and 2B are views each showing a configuration of an optical transmission system employing a dispersion-compensating optical fiber according to the present invention. On the other hand, FIGS. 3A and 3B are views showing a cross-sectional structure of a dispersion-compensating optical fiber according to the present invention and its refractive index profile, respectively.

First, referring to FIG. 2A, a dispersion-compensating optical fiber 100 according to the present invention is fusion-spliced to one end of a typical single-mode optical fiber 200 in order to compensate for the dispersion of the latter, whereby the optical fibers 100, 200 constitute an optical transmission line arranged between repeater stations 300a, 300b. Since the mode field diameters of the dispersion-compensating optical fiber 100 and the single-mode optical fiber 200 are remarkably different from each other, the mode field diameters thereof are preferably made approximately correspond to each other by using a splicing method such as "Thermal Expansion Core" technology, in proximity to the fusion-spliced portion. The decrease of the difference between these mode field diameters can effectively reduce the coupling loss between the fibers 100 and 200. Here, the repeater stations 300a, 300b include optical transmitters for transmitting light signals having a plurality of wavelengths and optical receivers. Therefore, the optical transmission line constituted by the dispersion-compensating optical fiber 100 and typical single-mode optical fiber 200 is provided in at least one of spaces between an optical transmitter and a repeater station, between repeater stations, and between a repeater station and an optical receiver.

In the optical transmission system, as shown in FIG. 2B, the dispersion-compensating optical fiber 100 may be constructed by fusion-splicing a plurality of components 101, 102, 103 whose optical characteristics approximate each other, whereas the single-mode optical fiber 200 may similarly be constructed by fusion-splicing a plurality of components 201, 202, 203 whose optical characteristics approximate each other.

The dispersion-compensating optical fiber 100 according to the first embodiment employed in an optical transmission system having such a configuration as one mentioned above comprises, as shown in FIG. 3A, a core region 110 extending along a predetermined axis and a cladding 120 provided so as to surround the outer periphery of the core region 110. Further, the core region 110 comprises a first core 111 having a refractive index $n_1$ and an outside diameter 2a; and a second core 112 provided so as to surround the outer periphery of the first core 111, having a refractive index $n_2$ higher than that of the first core 111, and having an outside diameter 2b. Here, the cladding 120 has a refractive index $n_3$ lower than that of the second core 112.

The dispersion-compensating optical fiber 100 according to the first embodiment is insured its single mode at a wavelength of 1.55 µm. The dispersion-compensating optical fiber 100 having a refractive index profile such as the one 150 shown in FIG. 3B is obtained, on the basis of silica glass, when the second core 112 is doped with $GeO_2$, for example.

The refractive index profile 150 shown in FIG. 3B indicates respective refractive indices at individual parts on the line L in FIG. 3A, such that areas 151, 152, and 153 in the refractive index profile 150 represent refractive indices of individual parts on the line L in the first core 111, second core 112, and cladding 120, respectively.

In the dispersion-compensating optical fiber 100 according to the first embodiment, with respect to the cladding 120 acting as a reference region, the relative refractive index difference $\Delta n_1$ of the first core 111 and the relative refractive index difference $\Delta n_2$ of the second core 112 are given by the following respective expressions:

$$\Delta n_1 = (n_1 - n_3)/n_3$$

$$\Delta n_2 = (n_2 - n_3)/n_3$$

where $n_1$ is the refractive index of the first core 111, $n_2$ is the refractive index of the second core 112, and $n_3$ is the refractive index of the cladding 120 acting as the reference region. In this specification, the relative refractive index difference of each part is expressed in terms of percentage, and individual parameters in the above-mentioned expressions may be placed in any order. Therefore, the relative refractive index difference of a glass region having a refractive index lower than that of the cladding 120 is expressed by a negative value.

Further, in order to compensate for the chromatic dispersion (about 19 ps/nm/km) in the 1.55-μm wavelength band of a typical single-mode optical fiber having a zero-dispersion wavelength in the 1.3-μm wavelength band, the dispersion-compensating optical fiber 100 according to the first embodiment has a chromatic dispersion of −10 ps/nm/km or less at the wavelength of 1.55 μm.

Figure 4:
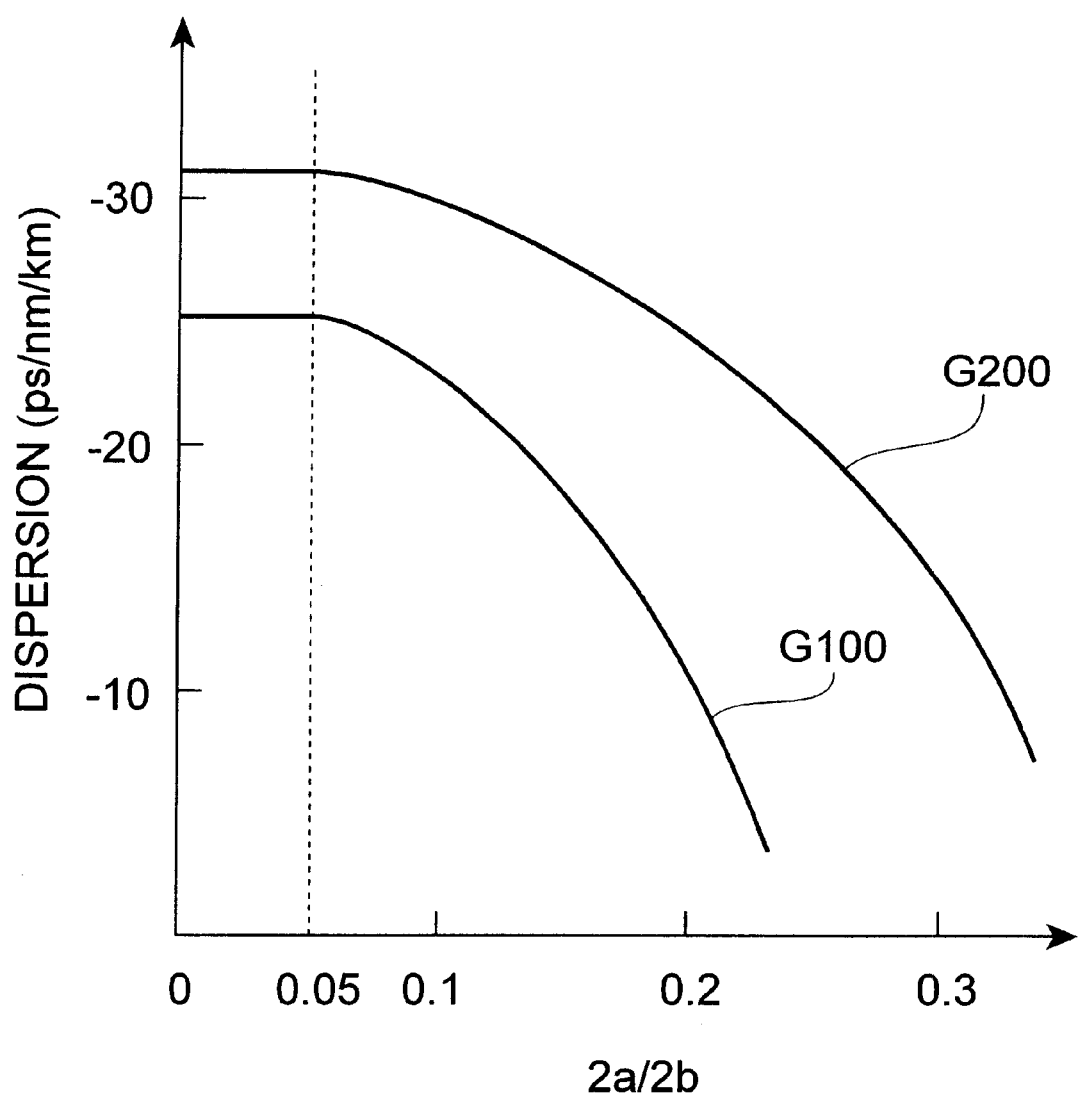
FIG. 4 is a graph showing relationships between the chromatic dispersion at a wavelength of 1.55 µm and the core outside diameter ratio 2a/2b in the dispersion-compensating optical fiber according to the first embodiment.

FIG. 4 is a graph showing relationships between the chromatic dispersion at the wavelength of 1.55 μm and the core outside diameter ratio 2a/2b in the dispersion-compensating optical fiber 100 according to the first embodiment shown in FIGS. 3A and 3B. In FIG. 4, G100 and G200 indicate curves for samples having effective areas $A_{\mathit{eff}}$ of 25 μm² and 30 82 m², respectively. In each of these samples, with reference to the cladding 120 having a refractive index $n_3$, the relative refractive index difference $\Delta n_1$ of the first core 111 is 1.20%, and the relative refractive index difference $\Delta n_2$ of the second core 112 is 0.15%. If the ratio 2a/2b of the outside diameter 2a of the first core 111 with respect to the outside diameter 2b of the second core 112 is 0, then the dispersion-compensating optical fiber 100 yields a refractive index profile of a simple core structure (see FIG. 1) in which the first core 111 does not exist.

As can be seen from FIG. 4, if the chromatic dispersion at the wavelength of 1.55 μm is constant, then the effective area $A_{\mathit{eff}}$ expands as the ratio 2a/2b is greater. This effect on expanding the effective area $A_{\mathit{eff}}$ is obtained in the range where the ratio 2a/2b is 0.05 or more.

As explained in the foregoing, the dispersion-compensating optical fiber 100 according to the first embodiment has the refractive index profile such as the one 150 shown in FIG. 3B, a core outside diameter ratio 2a/2b of 0.05 or more, and a chromatic dispersion of −10 ps/nm/km or less at a wavelength of 1.55 μm. As a consequence, the dispersion-compensating optical fiber 100 has a larger effective area $A_{\mathit{eff}}$, thereby suppressing the generation of nonlinear optical effects such as self phase modulation better than other dispersion-compensating optical fibers having the same chromatic dispersion and the same fiber length do, thus being able to transmit light signals having a higher power.

In the optical transmission system according to the first embodiment, an optical transmission line in which such a dispersion-compensating optical fiber and a single-mode optical fiber are fusion-spliced to each other is provided at least between repeater stations. Therefore, this optical transmission system not only lowers the chromatic dispersion as a whole, but also can transmit light signals with a high power due to a large effective area of the optical transmission line, thereby being able to elongate the distance (repeater spacing) between repeater stations comprising optical amplifiers for optically amplifying light signals. As a consequence, the number of repeaters can be restrained from increasing, whereby an optical transmission system with better performance per cost can be realized.

Here, the optical transmission systems shown in FIGS. 2A and 2B may comprise a structure which can employ not only the dispersion-compensating optical fiber according to the above-mentioned first embodiment but also those according to all the embodiments disclosed in this specification.

Second Embodiment

Figure 5:
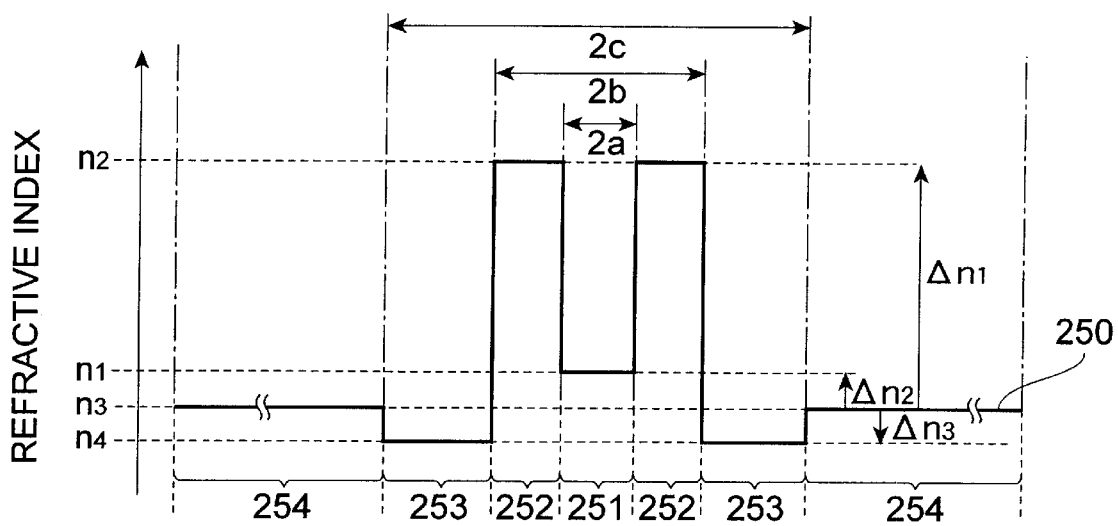
FIG. 5 is a view showing a refractive index profile of a second embodiment of the dispersion-compensating optical fiber according to the present invention.

A second embodiment of the dispersion-compensating optical fiber according to the present invention will now be explained. FIG. 5 is a view showing a refractive index profile of a dispersion-compensating optical fiber according to the second embodiment. The dispersion-compensating optical fiber according to the second embodiment comprises a structure similar to that of the above-mentioned first embodiment but differs therefrom in that a depressed region having a refractive index lower than that of each of the second core 112 and cladding 120 in the first embodiment is provided between the second core 112 and cladding 120.

This refractive index profile 250 indicates respective refractive indices at individual parts on a line (corresponding to the line L shown in FIG. 3A) intersecting the optical axis of the dispersion-compensating optical fiber according to the second embodiment. As a consequence, areas 251, 252, 253, and 254 in the refractive index profile 250 shown in FIG. 5 represent refractive indices of individual parts on the line L in the region (hereinafter referred to as first core) corresponding to the first core 111 in the first embodiment, the region (hereinafter referred to as second core) corresponding to the second core 112 in the first embodiment, the depressed region, and the region (hereinafter referred to as cladding) corresponding to the cladding 120 in the first embodiment, respectively.

In other words, the dispersion-compensating optical fiber according to the second embodiment having the refractive index profile 250 with the foregoing shape comprises a structure in which the first core, second core, depressed region, and cladding are successively provided about the optical axis. In the second embodiment, the first core has a refractive index $n_1$ and an outside diameter 2a. The second core is an area provided so as to surround the first core, and has a refractive index $n_2$ ($>n_1$) and an outside diameter 2b. The depressed region is an area provided so as to surround the second core, and has a refractive index $n_4$ ($<n_2$) and an outside diameter 2c. The cladding is an area provided so as to surround the depressed region and has a refractive index $n_3$ ($<n_2$, $>n_4$).

With respect to the cladding, the relative refractive index difference $\Delta n_1$ of the first core, the relative refractive index difference $\Delta n_2$ of the second core, and the relative refractive index difference $\Delta n_3$ of the depressed region, in the second embodiment, are given by the following respective expressions:

$$\Delta n_1 = (n_1 - n_3)/n_3$$

$$\Delta n_2 = (n_2 - n_3)/n_3$$

$$\Delta n_3 = (n_4 - n_3)/n_3$$

as in the first embodiment.

The dispersion-compensating optical fiber having the foregoing refractive index profile 250 is obtained, on the basis of silica glass, when the second core and the depressed region are doped with $GeO_2$ and F element, respectively, for example.

Also, the dispersion-compensating optical fiber according to the second embodiment compensates for the chromatic dispersion (about 19 ps/nm/km) in the 1.55-µm wavelength band of a typical single-mode optical fiber having a zero-dispersion wavelength in the 1.3-µm wavelength band. To this aim, the dispersion-compensating optical fiber according to the second embodiment preferably has a chromatic dispersion of −10 ps/nm/km or less at the wavelength of 1.55 µm.

Figure 6:
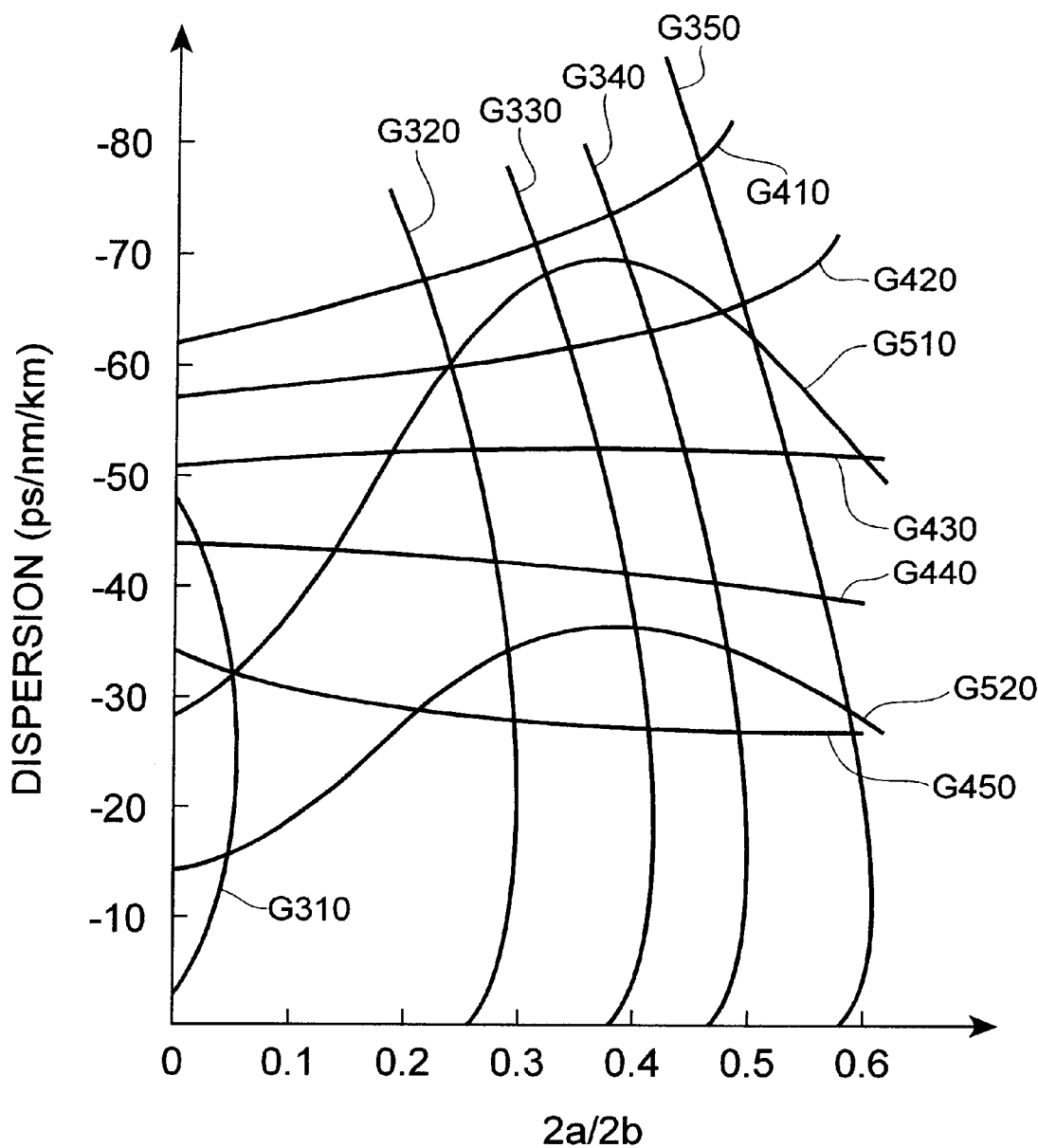
FIG. 6 is a graph showing relationships between the chromatic dispersion at a wavelength of 1.55 µm and the core outside diameter ratio 2a/2b in the dispersion-compensating optical fiber according to the second embodiment.

FIG. 6 is a graph showing relationships between the chromatic dispersion at the wavelength of 1.55 µm and the core outside diameter ratio 2a/2b in the dispersion-compensating optical fiber according to the second embodiment. In FIG. 6, curves G310 to G350 show relationships between the chromatic dispersion and ratio 2a/2b in a plurality of samples having different effective areas $A_{eff}$, such that G310, G320, G330, G340, and G350 are curves for samples having effective areas $A_{eff}$ of 15 µm², 20 µm², 25 µm², 30 µm², and 40 µm², respectively. Also, curves G410 to G450 in FIG. 6 show relationships between the chromatic dispersion and ratio 2a/2b in a plurality of samples having different dispersion slopes, such that G410, G420, G430, G440, and G450 are curves for samples having dispersion slopes of −0.25 ps/nm²/km, −0.20 ps/nm²/km, −0.15 ps/nm²/km, −0.10 ps/nm²/km, and −0.05 ps/nm²/km, respectively. Further, curves G510 and G520 in FIG. 6 show relationships between the chromatic dispersion and ratio 2a/2b in a plurality of samples having different cutoff wavelengths for fundamental-mode, such that G510 and G520 are curves for samples having cutoff wavelengths of 2.0 µm and 2.2 µm for fundamental-mode, respectively.

Figure 1:
FIG. 1 is a view showing a refractive index profile of a conventional dispersion-compensating optical fiber.

With reference to the cladding, the relative refractive index difference $\Delta n_1$ (=$(n_1-n_3)/n_3$) of the first core is 0%, the relative refractive index difference $\Delta n_2$ (=$(n_2-n_3)/n_3$) of the second core is +1.4%, and the relative refractive index difference $\Delta n_3$ (=$(n_4-n_3)/n_3$) of the depressed region is −0.4%, in each of the above-mentioned samples. Also, the outside diameter 2c of the depressed region is adjusted such that the dispersion slope generally attains a constant value (about −0.10 ps/nm²/km) regardless of the ratio 2a/2b of the outside diameter 2a of the first core with respect to the outside diameter 2b of the second core when the chromatic dispersion at the wavelength of 1.55 µm is −40 ps/nm/km. Here, the refractive index profile will be shaped as shown in FIG. 1 if the ratio 2a/2b is 0.

As can be seen from FIG. 6, if the chromatic dispersion at the wavelength of 1.55 µm is constant, then the effective area $A_{eff}$ expands as the ratio 2a/2b is greater. The effect on expanding the effective area $A_{eff}$ is favorably obtained in the area where the ratio 2a/2b is 0.05 or more. The cutoff wavelength for fundamental-mode becomes longer as the ratio 2a/2b is greater if the ratio 2a/2b is about 0.4 or less, whereas it becomes shorter as the ratio 2a/2b is greater if the ratio 2a/2b is about 0.4 or more. It is assumed to be because of the fact that the mode distribution of fundamental-mode changes greatly. If the ratio 2a/2b is about 0.6 or more, on the other hand, then the optical fiber is more susceptible to bending, thereby increasing transmission loss (deteriorating transmission quality). In view of the foregoing consideration, it is preferred that the ratio 2a/2b be 0.05 or more but 0.6 or less. Also, it is preferred that the increase of loss at the wavelength of 1.55 µm when the optical fiber is wound by one turn about a mandrel having a diameter of 32 mm be 0.5 dB or less. Further, the dispersion-compensating optical fiber according to the second embodiment has a negative dispersion slope at the wavelength of 1.55 µm, thereby being able to compensate for the dispersion slope of a typical single-mode optical fiber (having a chromatic dispersion of about +19 ps/nm/km and a dispersion slope of +0.055 ps/nm²/km at the wavelength of 1.55 µm) as well.

As explained in the foregoing, the dispersion-compensating optical fiber according to the second embodiment has an effective area larger than that of other dispersion-compensating optical fibers having the same chromatic dispersion and the same length, thereby effectively suppressing the generation of nonlinear optical effects such as self phase modulation, thus being able to transmit light signals with a higher power. Also, since it has a longer cutoff wavelength for fundamental-mode, even if cutoffs caused by disturbances such as microbend and macrobend affect the shorter wavelength side, transmission loss will not increase in the signal wavelength. band.

The optical transmission system according to the present invention (whose specific configurations are shown in FIGS. 2A and 2B) employs an optical transmission line in which the dispersion-compensating optical fiber having the structure such as one mentioned above and a single-mode optical fiber are fusion-spliced to each other. As a consequence, this optical transmission system not only totally reduces both chromatic dispersion and dispersion slope in the signal wavelength band, but also can transmit light signals with a higher power, thereby being able to elongate the distance (repeater spacing) between repeater stations comprising optical amplifiers for optically amplifying light signals. It means reduction in the number of repeaters, and enables an inexpensive system to be constructed. Also, even if disturbances such as microbend and macrobend occur upon cabling or the like, transmission loss in the signal wavelength band will not increase, whereby the distance between repeater stations can be elongated from this point as well, so as to make it possible to construct a system excellent in performance per cost.

Three kinds of applied examples of the dispersion-compensating optical fiber according to the second embodiment will now be explained.

In the first applied example, with reference to the cladding having the refractive index $n_3$, the relative refractive index difference $\Delta n_1$ of the first core having the refractive index $n_1$ was +0.1%, the relative refractive index difference $\Delta n_2$ of the second core having the refractive index $n_2$ was +1.4%, and the relative refractive index difference $\Delta n_3$ of the depressed region having the refractive index $n_4$ was −0.4%. On the other hand, the outside diameters 2a, 2b, and 2c of the first core, second core, and depressed region were 0.5 µm, 3.0 µm, and 8.0 µm, respectively. The dispersion-compensating optical fiber according to the first applied example exhibited, as characteristics at the wavelength of 1.55 µm, a chromatic dispersion of ±45 ps/nm/km, a dispersion slope of −0.1 ps/nm²/km, an effective area $A_{eff}$ of 20 µm², and a transmission loss of 0.25 dB/km. In addition, when the optical fiber was wound by one turn about a mandrel having a diameter of 32 mm, the increase of loss was 0.1 dB, and all of its optical characteristics were favorable.

In the second applied example, with reference to the cladding having the refractive index $n_3$, the relative refractive index difference $\Delta n_1$ of the first core having the refractive index $n_1$ was 0%, the relative refractive index difference $\Delta n_2$ of the second core having the refractive index $n_2$ was +1.2%, and the relative refractive index difference $\Delta n_3$ of the depressed region having the refractive index $n_4$ was −0.4%. On the other hand, the outside diameters 2a, 2b, and 2c of the first core, second core, and depressed region were 0.7 µm, 3.0 µm, and 8.0 µm, respectively. The dispersion-compensating optical fiber according to the second applied example exhibited, as characteristics at the wavelength of 1.55 µm, a chromatic dispersion of −45 ps/nm/km, a dispersion slope of −0.12 ps/nm²/km, an effective area $A_{eff}$ of 22 µm², and a transmission loss of 0.24 dB/km. In addition, when the optical fiber was wound by one turn about a mandrel having a diameter of 32 mm, the increase of loss was 0.3 dB, and all of its optical characteristics were favorable.

In an optical transmission line in which the dispersion-compensating optical fiber according to the second applied example and a typical single-mode optical fiber (having a chromatic dispersion of 19 ps/nm/km and a dispersion slope of 0.055 ps/nm²/km at the wavelength of 1.55 µm) were fusion-spliced to each other at a length ratio of 1/2.4 exhibited a total chromatic dispersion of about 0 ps/nm/km and a total dispersion slope of +0.003 ps/nm²/km. Thus, both of the chromatic dispersion and dispersion slope are very low in this optical transmission line as a whole, so that the signal distortion of each signal wavelength caused by chromatic dispersion and nonlinear optical effects can be suppressed over a wide signal wavelength band, whereby it is favorable as a transmission line for WDM transmission.

In the third applied example, with reference to the cladding having the refractive index $n_3$, the relative refractive index difference $\Delta n_1$ of the first core having the refractive index $n_1$ was −0.10%, the relative refractive index difference $\Delta n_2$ of the second core having the refractive index $n_2$ was +1.30%, and the relative refractive index difference $\Delta n_3$ of the depressed region having the refractive index $n_4$ was −0.50%. On the other hand, the outside diameters $2a$, $2b$, and $2c$ of the first core, second core, and depressed region were 0.5 µm, 3.5 µm, and 10.5 µm, respectively. The dispersion-compensating optical fiber according to the third applied example exhibited, as characteristics at the wavelength of 1.55 µm, achromatic dispersion of −19 ps/nm/km, a dispersion slope of −0.055 ps/nm²/km, an effective area $A_{eff}$ of 17 µm², and a transmission loss of 0.26 dB/km. In addition, when the optical fiber was wound by one turn about a mandrel having a diameter of 32 mm, the increase of loss was 0.1 dB, and all of its optical characteristics were favorable.

In an optical transmission line in which the dispersion-compensating optical fiber according to the third applied example and a typical single-mode optical fiber (having achromatic dispersion of 19 ps/nm/km and a dispersion slope of 0.055 ps/nm²/km at the wavelength of 1.55 µm) were fusion-spliced to each other at a length ratio of 1/1 exhibited a total chromatic dispersion of about 0 ps/nm/km and a total dispersion slope of about 0 ps/nm²/km. Thus, both of the chromatic dispersion and dispersion slope totally become about 0 in the optical transmission line employing the third embodiment and thus are very small, so that the signal distortion of each signal wavelength caused by chromatic dispersion and nonlinear optical effects can be suppressed over a wide signal wavelength band, whereby it is favorable as a transmission line for WDM transmission.

Third Embodiment

Figure 7:
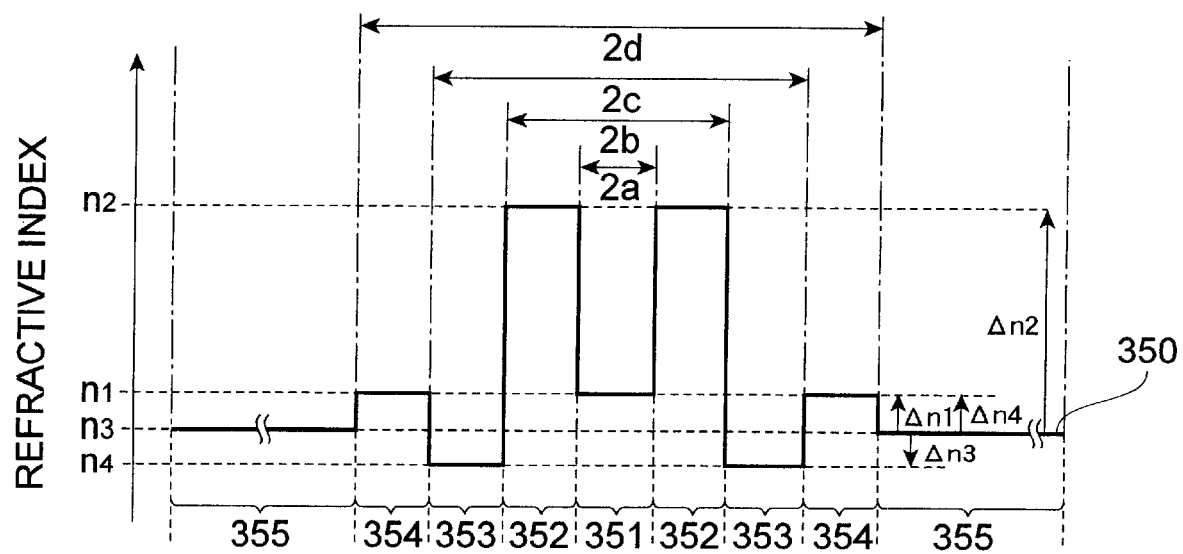
FIG. 7 is a view showing a refractive index profile of a third embodiment of the dispersion-compensating optical fiber according to the present invention.

Without being restricted to the above-mentioned first and second embodiments, the dispersion-compensating optical fiber according to the present invention can be modified in various manners. For example, FIG. 7 is a view showing a refractive index profile of a third embodiment of the dispersion-compensating optical fiber according to the present invention. The dispersion-compensating optical fiber according to the third embodiment has a structure basically similar to that of the above-mentioned second embodiment but differs therefrom in that an intermediate region having a refractive index higher than that of each of the depressed region and cladding region but lower than that of the second core is provided between the depressed region and the cladding.

The refractive index profile 350 shown in FIG. 7 indicates respective refractive indices at individual parts on a line (corresponding to the line L shown in FIG. 3A) intersecting the optical axis of the dispersion-compensating optical fiber according to the third embodiment as in the first embodiment. As a consequence, areas 351, 352, 353, 354, and 355 in the refractive index profile 350 represent refractive indices of individual parts on the line L in the region (hereinafter referred to as first core) corresponding to the first core 111 in the first embodiment, the region (hereinafter referred to as second core) corresponding to the second core 112 in the first embodiment, the region (hereinafter referred to as depressed region) corresponding to the depressed region in the second embodiment, the intermediate region, and the region (hereinafter referred to as cladding) corresponding to the cladding 120 in the first embodiment, respectively.

In other words, the dispersion-compensating optical fiber according to the third embodiment having the refractive index profile 350 with the foregoing shape comprises a structure in which the first core, second core, depressed region, intermediate region, and cladding are successively provided about the optical axis. In the third embodiment, the first core has a refractive index $n_1$ and an outside diameter $2a$. The second core is an area provided so as to surround the first core, and has a refractive index $n_2$ ($>n_1$) and an outside diameter $2b$. The depressed region is an area provided so as to surround the second core, and has a refractive index $n_4$ ($<n_2$) and an outside diameter $2c$. The intermediate region is an area provided so as to surround the depressed region, and has a refractive index $n_5$ ($<n_2$, $>n_4$) and an outside diameter $2d$. The cladding is an area provided so as to surround the intermediate region and has a refractive index $n_3$ ($<n_5$, $>n_4$).

With respect to the cladding, the relative refractive index difference $\Delta n_1$ of the first core, the relative refractive index difference $\Delta n_2$ of the second core, the relative refractive index difference $\Delta n_3$ of the depressed region, and the relative refractive index difference $\Delta n_4$ of the intermediate region in the third embodiment are given by the following respective expressions:

$\Delta n_1 = (n_1 - n_3)/n_3$ $\Delta n_2 = (n_2 - n_3)/n_3$ $\Delta n_3 = (n_4 - n_3)/n_3$ $\Delta n_4 = (n_5 - n_3)/n_3$ as in the first embodiment.

The dispersion-compensating optical fiber having the foregoing refractive index profile 350 is obtained, on the basis of silica glass, when the second core and the intermediate region are doped with $GeO_2$, and the depressed region is doped with F element, for example.

Also, the dispersion-compensating optical fiber according to the third embodiment compensates for the chromatic dispersion (about 19 ps/nm/km) in the 1.55-µm wavelength band of a typical single-mode optical fiber having a zero-dispersion wavelength in the 1.3-µm wavelength band. To this aim, the dispersion-compensating optical fiber according to the third embodiment preferably has a chromatic dispersion of −10 ps/nm/km or less at the wavelength of 1.55 µm.

As explained in the foregoing, the present invention provides a dispersion-compensating optical fiber which is insured its single mode at the wavelength of 1.55 µm, and has a refractive index profile with a shape in which the center part of the core region is depressed. The ratio $2a/2b$ of the outside diameter $2a$ of the first core located on the inner side in the areas constituting the core region with respect to the outside diameter $2b$ of the second core provided on the outer periphery of the first core is 0.05 or more. The optical fiber has a chromatic dispersion of −10 ps/nm/km or less as a characteristic at the wavelength of 1.55 µm. The dispersion-compensating optical fiber according to the present invention can yield a larger effective area since the outside diameter ratio of the first and second cores is set as such, thereby not only compensating for the chromatic dispersion of a typical single-mode optical fiber but also being able to effectively suppress the generation of nonlinear optical effects. Also, an optical transmission system employing this dispersion-compensating optical fiber as its optical transmission line can transmit light signals with a higher power, thereby allowing the distance between repeater stations to elongate.

In the configuration in which a depressed region having a refractive index lower than that of the cladding is provided between the core region and the cladding, the cutoff wavelength for fundamental-mode can be made longer, whereby the dispersion slope at the wavelength of 1.55 μm becomes negative. In this case, the dispersion-compensating optical fiber can compensate for both chromatic dispersion and dispersion slope of a typical single-mode optical fiber. Also, since the cutoff wavelength for fundamental-mode is longer, the transmission loss in the signal wavelength band will not increase even if cutoffs caused by disturbances such as microbend and macrobend affect the shorter wavelength side. From the foregoing points, the optical transmission system employing this dispersion-compensating optical fiber as its optical transmission line can also elongate the distance between repeater stations and can reduce the number of repeater stations, thereby being able to construct a system excellent in performance per cost.

Further, when the outside diameter ratio of the first and second cores is 0.6 or less, the dispersion-compensating optical fiber can effectively suppress the increase of transmission loss caused by bending. Specifically, when the increase of loss at the wavelength of 1.55 μm upon winding by one turn at a diameter of 32 mm is suppressed to 0.5 dB or less, the transmission loss in the signal wavelength band will not increase even if disturbances such as microbend and macrobend caused by cabling or the like occur.

The optical transmission system according to the present invention comprises an optical transmission line in which a dispersion-compensating optical fiber comprising a structure such as one mentioned above and another optical fiber having a positive chromatic dispersion at the wavelength of 1.55 μm are optically connected to each other. Since such an optical transmission line is provided, the optical transmission system yields a very small chromatic dispersion as a whole and lowers its dispersion slope. Also, it, can effectively suppress the signal distortion of each signal wavelength caused by the chromatic dispersion and nonlinear optical effects, thereby being employable as the transmission line for WDM transmission.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion-compensating optical fiber insured its single mode at a wavelength of 1.55 μm, said dispersion-compensating optical fiber comprising:

a first core extending along a predetermined axis, said core having a refractive index $n_1$ and an outside diameter 2a;

a second core provided on the outer periphery of said first core, said second core having a refractive index $n_2$ higher than that of said first core and an outside diameter 2b; and a cladding provided on the outer periphery of said second core, said cladding having a refractive index $n_3$ lower than that of said second core;

wherein said dispersion-compensating optical fiber has a chromatic dispersion of (−10 ps/nm/km or more negative at the wavelength of 1.55 μm, and the ratio 2a/2b of the outside diameter 2a of said first core with respect to the outside diameter 2b of said second core is 0.05 or more.

2. A dispersion-compensating optical fiber according to claim 1, wherein said dispersion-compensating optical fiber has a negative dispersion slope at the wavelength of 1.55 μm.

3. A dispersion-compensating optical fiber according to claim 1, wherein the ratio 2a/2b of the outside diameter 2a of said first core with respect to the outside diameter 2b of said second core is 0.6 or less.

4. A dispersion-compensating optical fiber according to claim 1, wherein the increase of loss with respect to light of the wavelength of 1.55 μm is 0.5 dB or less when said dispersion-compensating optical fiber is wound by one turn at a diameter of 32 mm.

5. A dispersion-compensating optical fiber according to claim 1, further comprising a depressed region provided between said second core and said cladding, said depressed region having a refractive index $n_4$ lower than that of each of said second core and cladding.

6. A dispersion-compensating optical fiber according to claim 5, further comprising an intermediate region provided between said depressed region and said cladding, said intermediate region having a refractive index $n_5$ higher than that of each of said depressed region and cladding but lower than that of said second core.

7. An optical transmission system having:

a dispersion-compensating optical fiber according to claim 1; and an optical fiber optically connected to said dispersion-compensating optical fiber, said optical fiber having a positive chromatic dispersion at a wavelength of 1.55 μm.

8. A dispersion compensating optical fiber comprising:

a first core extending along a predetermined axis, said core having a refractive index $n_1$ and an outside diameter 2a;

a second core provided on the outer periphery of said first core, said second core having a refractive index $n_2$ higher than that of said first core and an outside diameter 2b; and a cladding provided on the outer periphery of said second core, said cladding having a refractive index $n_3$ lower than that of said second core;

wherein said optical fiber has a chromatic dispersion of −10 ps/nm/km or more negative at the wavelength of 1.55 μm, and the ratio 2a/2b of the outside diameter 2a of said first core with respect to the outside diameter 2b of said second core is 0.05 or more.

9. A dispersion-compensating optical fiber according to claim 1, wherein said chromatic dispersion falls within the range of −45 to −19 ps/nm/km at the wavelength of 1.55 μm.

10. A dispersion-compensating optical fiber according to claim 1, said dispersion-compensating optical fiber has an effective area of 15 to 40 μm² at the wavelength of 1.55 μm.

11. A dispersion-compensating optical fiber according to claim 1, said dispersion-compensating optical fiber has a negative dispersion slope of −0.25 to −0.05 ps/nm²/km at the wavelength of 1.55 μm.

* * * * *